(12) United States Patent
McGovern

(10) Patent No.: US 6,920,953 B2
(45) Date of Patent: Jul. 26, 2005

(54) ELECTRICALLY ASSISTED PEDALED VEHICLE

(76) Inventor: James Robert McGovern, 63B Independance Ct., Yorktown Heights, NY (US) 10598

( * ) Notice: Subject to any disclaimer, the term of this patent is extended or adjusted under 35 U.S.C. 154(b) by 131 days.

(21) Appl. No.: 10/442,875

(22) Filed: May 21, 2003

(65) Prior Publication Data

US 2004/0003952 A1 Jan. 8, 2004

(51) Int. Cl.[7] ............................................. B62D 61/02
(52) U.S. Cl. ....................... 180/205; 180/220; 280/258; 280/217
(58) Field of Search ............................... 180/220, 205, 180/206, 207, 65.1, 65.5; 280/217, 253, 255, 258

(56) References Cited

U.S. PATENT DOCUMENTS 4,445,701 A * 5/1984 Stroud ........................ 280/217
4,712,806 A * 12/1987 Patrin ......................... 280/217
6,676,150 B1 * 1/2004 Goldstein .................... 280/293

* cited by examiner

Primary Examiner—Kevin Hurley

(57) ABSTRACT

An improved electrically assisted bicycle has rear wheel, right and left, propulsion elements, each side having a modified freewheel that carries a hand operated electromagnetic-mechanical pawl, deployed along a pedal bar by a tape connected to a pawl positioning control box lever, a freewheel wheel with radian oriented grooves in its inboard face, and the equivalent of a motor back plate on its outboard face, said grooves being compatible with a ratcheting motion by said pedal bar pawl, said back plate supporting an electric motor's field coils, current rings, and motor brushes, that collectively compliment a motor armature, commutator, and current ring brushes, where wheel ratcheting torque is applied to one side, and motor torque to the other, said bicycle also having a battery, a controlling rheostat, and a pedal actuated circuit current on/off switch, so that a rider can manually deploy ratcheting pawls to selected pedal leverage points on said wheel, while combining therewith, mixed-in applications of variable motor leverage to achieve greater vehicle efficiency.

17 Claims, 13 Drawing Sheets

"The Velour Flyer"

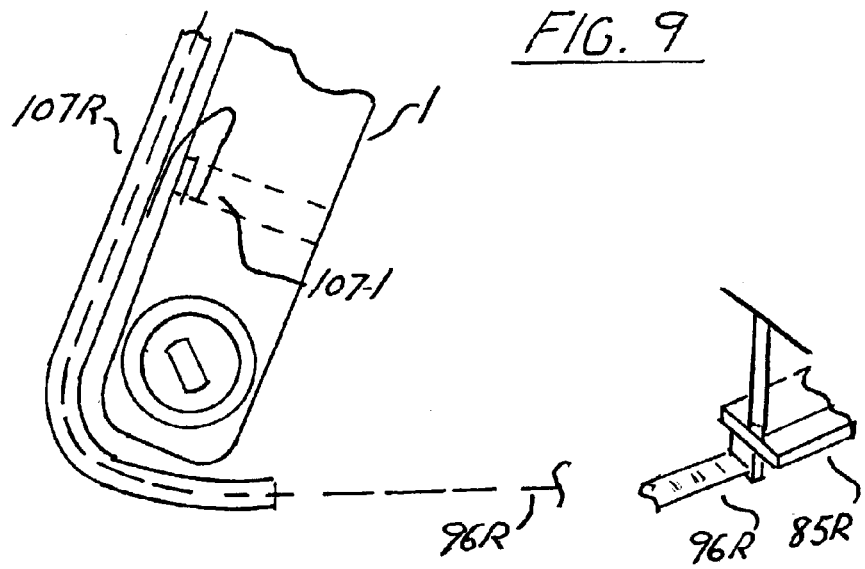
FIG. 9
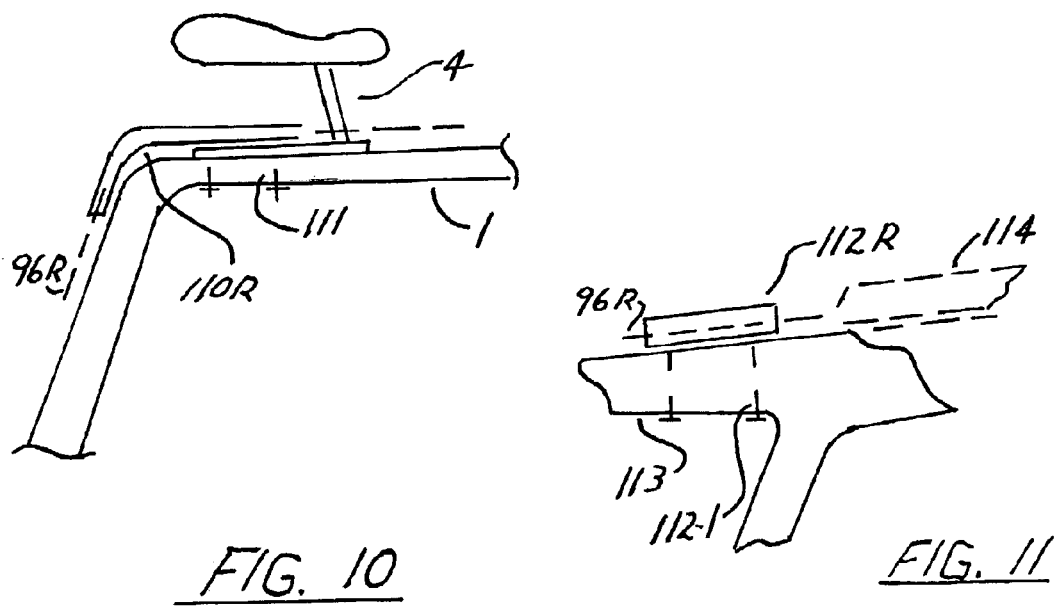
FIG. 10
FIG. 11

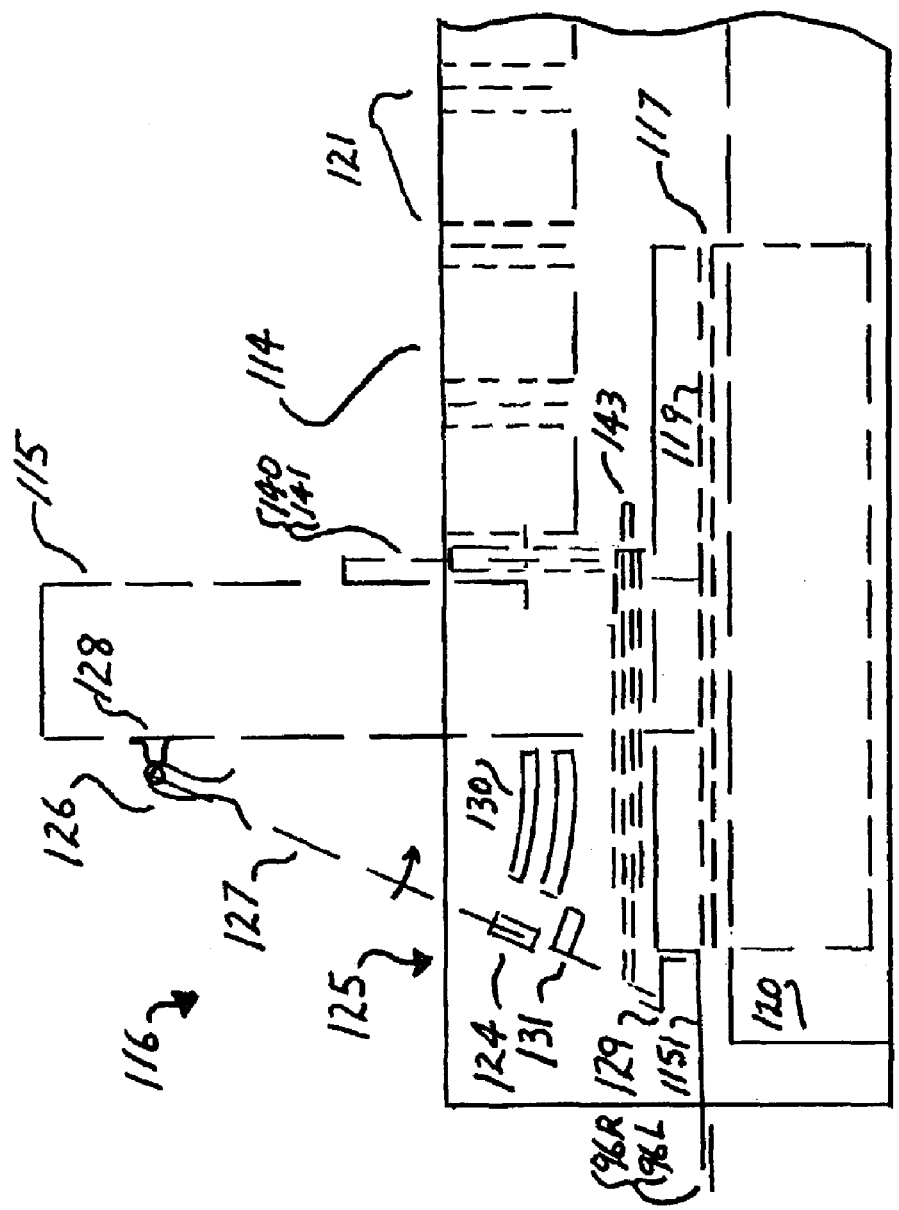

US 6,920,953 B2

ELECTRICALLY ASSISTED PEDALED VEHICLE

BACKGROUND OF THE INVENTION

U.S. Pat. No. 5,662,187 provides means of delivering the torque from a rider's pedalling and the torque from an electric motor to a fixed diameter freewheel as a blend, simultaneously.

There is no provision for taking advantage, on the riders part, of the build-up of momentum, that could be used to improve propulsion efficiency by providing a means that would allow selective use of variable points of leverage, along a freewheel radian, while applying pedal torque to the freewheel.

SUMMARY OF THE INVENTION

It is therefore an object of the present invention to provide apparatus that will allow a bicycle rider to apply pedal generated, wheel propelling, torque to the rear wheel of the bicycle at a point selected from a graduated range of leverage points along a wheel radian.

And it is therefore an object of the present invention to provide a modified freewheel body that can carry a wheel that can receive pedal generated, wheel propelling, torque, and transfer it to the bicycle wheel's hub.

It is also an object of the present invention to provide a modified freewheel body that can carry a typical pedal bar.

And it is also an object of the present invention to provide a typical pedal bar that can support a pawl that is moveable and can be mechanically positioned along the bar, and therefore along a radian of the freewheel wheel.

And again, it is also an object of the present invention to provide apparatus, in an assembly, that will allow the bicycle rider to impart rotational motion to the wheel on the freewheel body by reciprocatingly ratcheting the wheel with a pedal bar that carries a moveable pawl.

And it is an object of the present invention to provide a modified freewheel body that can carry an electric motor back plate that can transmit torque from an electric motor to the freewheel wheel.

And in a similar vein, further objects of the present invention are disclosed as follows:

to provide a stationary elongated axle that while carrying the above described modified freewheel, can also carry other components of an electric motor including its housing, brushes, field windings, armature, and commutator;

to provide apparatus that stationarily connects the motor's armature and commutator to the stationary axle;

to provide an electric circuit that includes a pedal chain actuated motor on/off switch;

to provide apparatus that makes the production of motor torque dependent upon pedal bar movement by the rider;

to provide rheostat control of current flow to the electric motor;

to provide mechanical control of the movement and placement of a pedal bar's pawl;

to provide apparatus that will limit the travel of a pedal bar;

and conclusively, to provide corresponding combinations of wheel propulsion apparatus on the right side, as well as on the left side, of the bicycle's rear wheel.

DRAWING DESCRIPTIONS

FIG. 9 is a drawing of a bracket that is used to guide a hand actuated pawl deployment tape's movement toward a pawl locator control box.

FIG. 10 is a drawing of a seat post supported pawl deployment tape bracket.

FIG. 11 is a drawing of a cross bar supported pawl deployment tape bracket.

FIG. 12 is a side elevation view drawing of a pawl deployment control box.

SPECIFICATION

Figure 1:
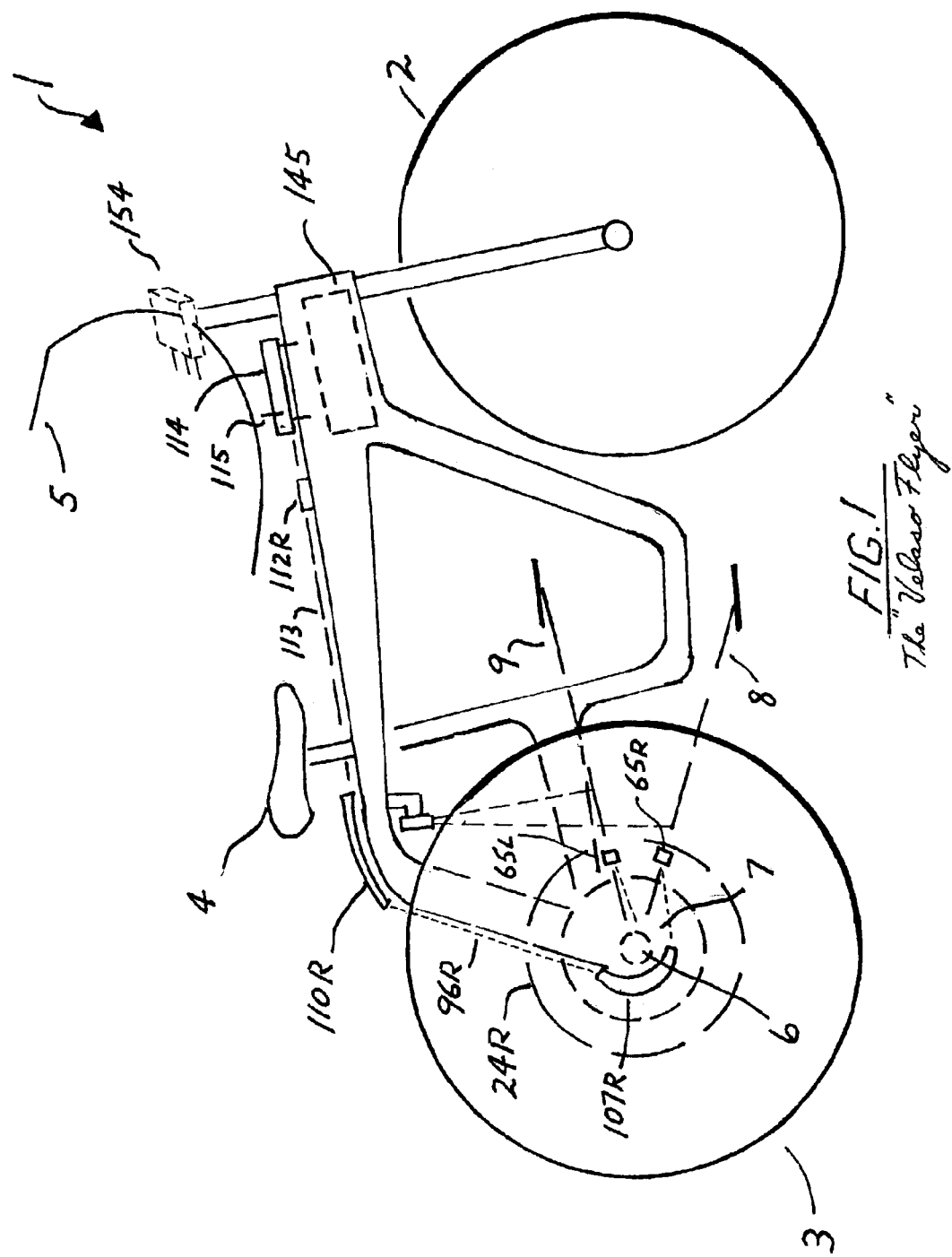
FIG. 1 is a conceptual elevation view of a motor assisted, pedal bar propelled, bicycle.

With reference to the specification for an electrically assisted pedalled bicycle, set forth in U.S. Pat. No. 5,662,187, and with reference to FIG. 1 of the instant invention, presented herewith, proceed to construct what is proposed as an improvement of the U.S. Pat. No. 5,662,187 invention.

Provide typical bicycle elements including a frame with a 28" front wheel 2, a 28" rear wheel 3, a seat 4, a handlebar 5, an elongated rear wheel axle 6, and a rear wheel hub 7 that is threaded conventionally on its right side.

The hub 7 has a left hand thread on its left side.

Continuing, provide atypical bicycle elements that include a pedal bar 8 on the right side of the rear wheel hub 7, a pedal bar 9 on the left side of the rear wheel hub 7, and a pedal bar equalizer assembly 10 comprised of a chain 11, and chain diverter pulley 12. The pulley 12 is carried by the bicycle frame 1, on bracket 12-1. The chain 11, while draped over the pulley 12, has one of its ends connected to the right side pedal bar 8, and its other end connected to the left side pedal bar 9.

Figure 2:
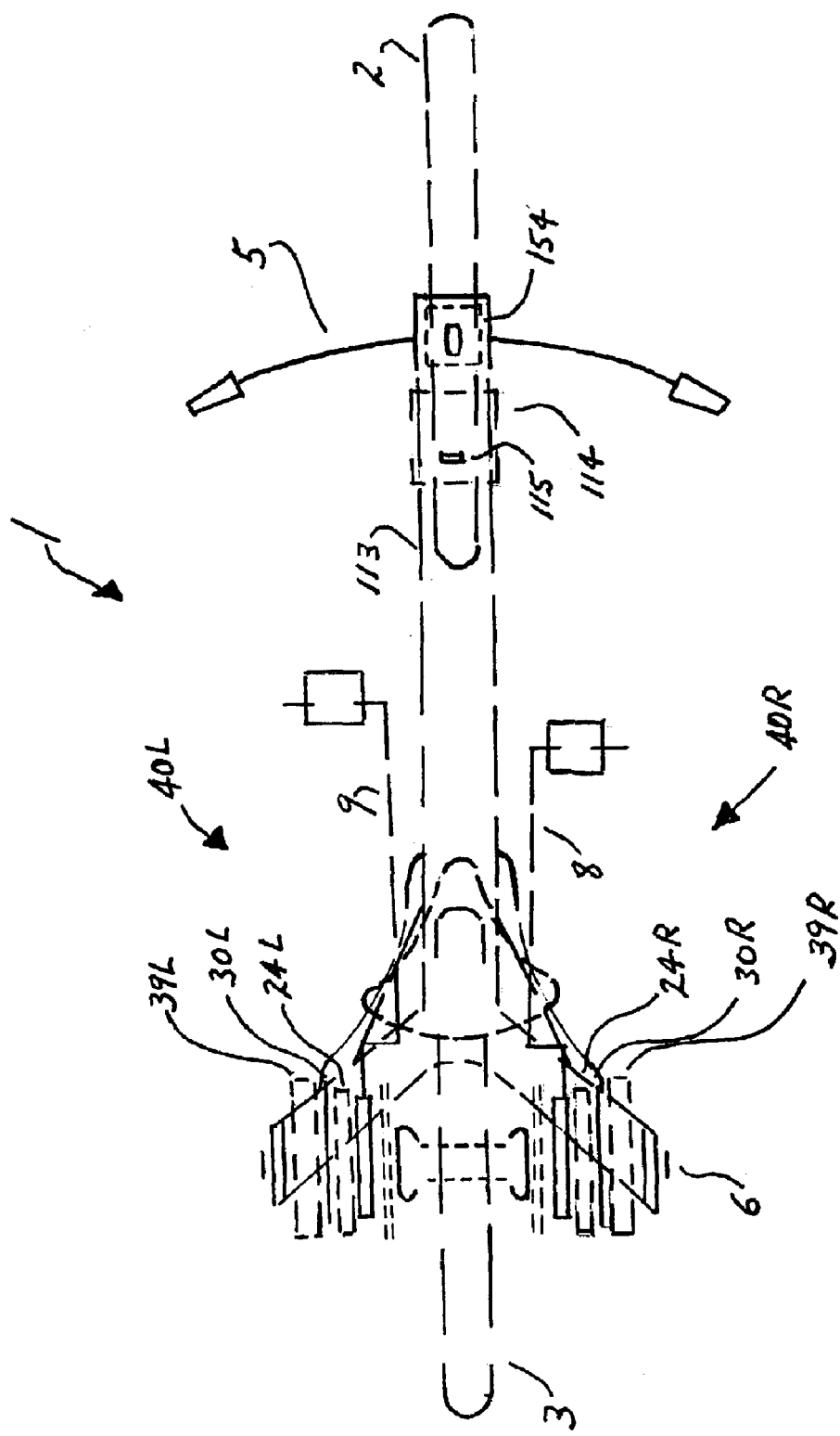
FIG. 2 is a top view of a motor assisted pedal bar propelled bicycle that identifies the placement of pedal bars, and motor apparatus on the right side of the bicycle's rear wheel, and on the left side of the bicycle's rear wheel.

Constructors Note 1:

Since FIG. 2 discloses a configuration that provides rear wheel torque propulsion apparatus on both sides of the bicycle's rear wheel, and since it is noted that the apparatus on one side is nearly identical to the apparatus on the other side, the specification is directed to detailing both sides of the wheel simultaneously, so that in constructing the prototype of the invention, assembly of apparatus can be achieved, on both sides of the wheel 3, simultaneously.

So, with this concept as our intent, commencing, provide a typical but modified freewheel body 13R that is right hand threaded onto hub 7's right side, and a typical but modified freewheel body 13L that is left hand threaded onto hub 7's left side.

Figure 3:
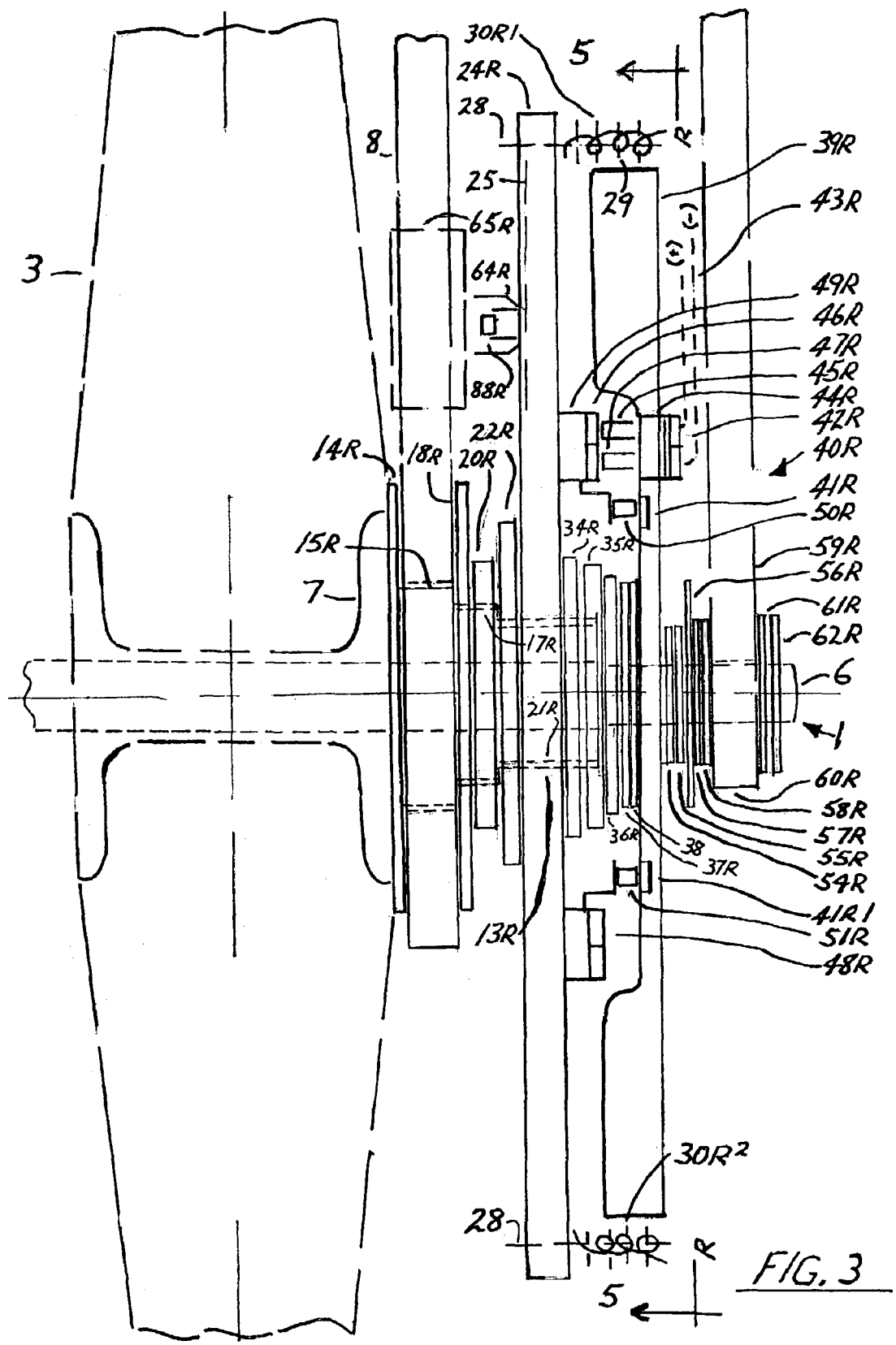
FIG. 3 is a rear elevation view of the bicycle's rear wheel that shows in detail, the placement of wheel propulsion apparatus, on the right side of the wheel.
Figure 4:
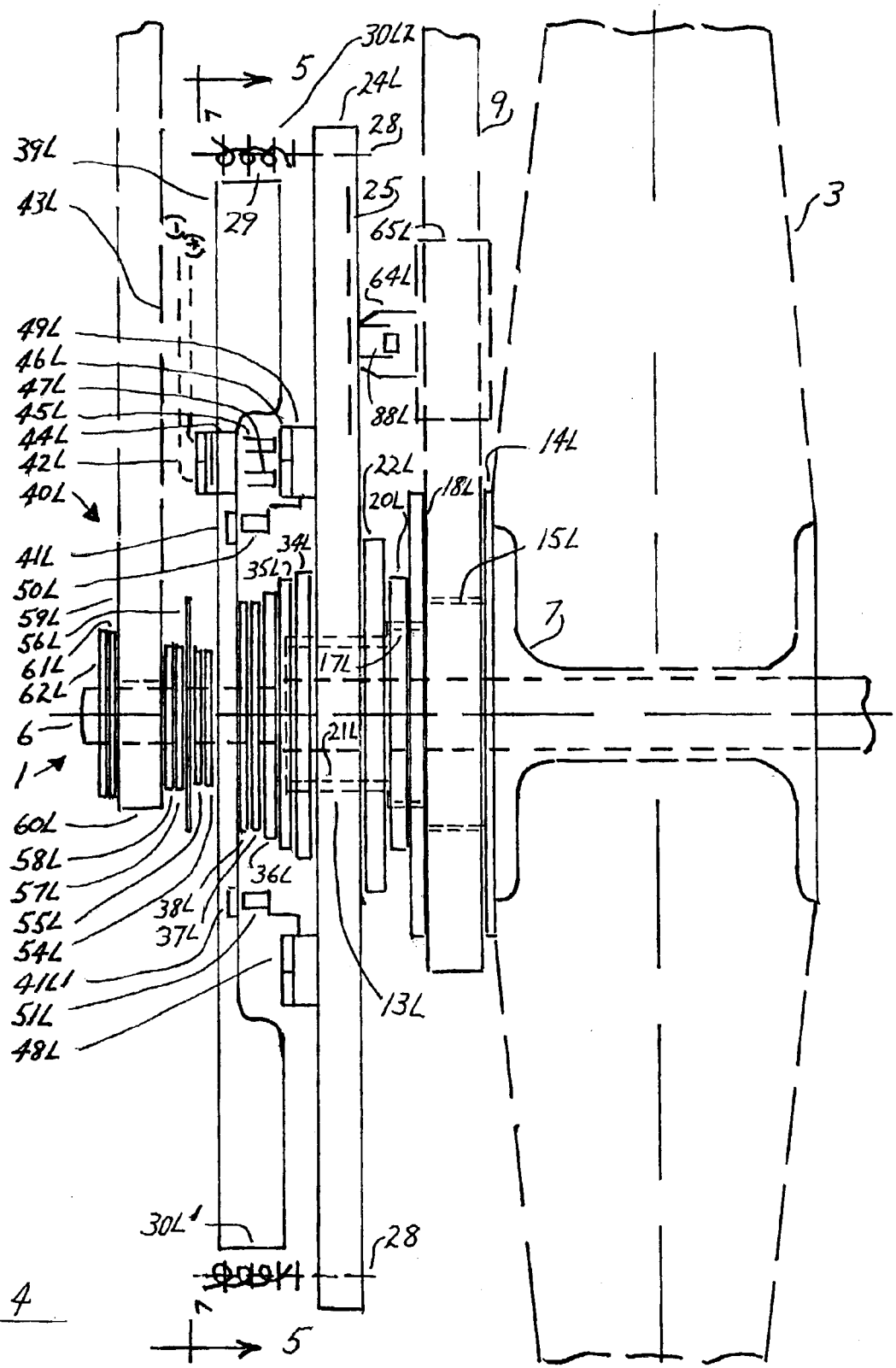
FIG. 4 is a rear elevation view of the bicycle's rear wheel that shows in detail, the placement of wheel propulsion apparatus, on the left side of the wheel.

Each of these freewheel bodys, 13R and 13L, has an inboard vertical face that incorporates a bushing 14 that is embodied in its casting. See FIG. 3 and FIG. 4

Adjacent each bushing, provide, encircling the outer circumference of each body, a wide smooth bearing surface, 15R on 13R and 15L on 13L.

Pedal bar 8 and pedal bar 9, each has a smooth bearing surface, mounting hole 16, in its hub end.

Pedal bar 8's hub end corresponds in width to bearing surface 15R, and pedal bar 9's hub end corresponds in width to bearing surface 15L, so the two bars can be mounted.

Now, just beyond the outboard vertical face of pedal bar 8's mounting hole 16, provide a step-down in the freewheel body's 13R circumference, and just beyond the outboard vertical face of pedal bar 9's mounting hole 16, provide a step-down in the freewheel body's 13L circumference.

And, on the stepped down surface of each body, that is on 13R and on 13L, provide a plurality of axle 6 oriented grooves 17.

On the outboard face of each pedal bar, 8 and 9, and on the stepped down surface of each body, that is on 13R and 13L, provide a bushing 18, that corresponds in outside diameter to the 14 bushing, and that has a plurality of lugs 19 in its interior mounting hole that correspond to the body, 13R and 13L, grooves 17 that they engage. See FIG. 3 and FIG. 4.

Constructors Note 2:

The construction consisting of bearing surface 15(R and L), between bushing 14 and bushing 18, resembles a "pulley, where 14 and 18 are like flanges, and a pedal bar (8 and 9) is flexibly fastened with its mounting hole mounted within the "pulley" flanges, carried free to move up and down.

Outboard of each 18 bushing, provide a stabilizing retaining nut, 20R, right hand threaded onto body 13R, and 20L, left hand threaded onto body 13L.

Each nut, 20R and 20L, should be disposed engaging the outboard surface of the 18 bushing adjacent to it.

Freewheel body 13R is stepped down, again, just outboard of the 20R retaining nut, and freewheel body 13L is stepped down, also again, just outboard of retaining nut 20L.

The stepped down bodys, 13R and 13L, are each provided, on this their second step, with a plurality of axle 6 oriented grooves 21, on the stepped circumference surface.

Outboard of, and adjacent to, nuts 20R and 20L, provide stabilizing disks 22R and 22L.

The disks 22R and 22L each have center mounting hole lugs 23 that correspond to body 13R's and body 13L's surface grooves 21.

Again, continuing, provide large, up to 12" diameter, corresponding, freewheel wheels 24R and 24L, each with center mounting hole lugs 23 that engage the grooves 21 on the corresponding bodies they are mounted on,—24R on right side body 13R, and 24L on left side body 13L. Continue reference to FIG. 3 and FIG. 4.

Disk 22R, disposed hard against the second step in body 13R, lends stability to the inboard face of freewheel wheel 24R, and disk 22L, disposed hard against the second step in body 13L, lends stability to the inboard face of freewheel wheel 24L.

The inboard vertical face of each freewheel wheel, 24R and 24L, carries a plurality of radian oriented grooves 25 that extend in length from near the wheel center hole 26, to near the wheel outer circumference.

A groove's 25 seat surface 27 is disposed at an angle of approximately 93° from the vertical, to facilitate smooth engagement and disengagement of the wheel, 24R and 24L, vertical surface by a pawl end point, which is specified below, when the wheels, 24R and 24L, are propelled by ratcheting. See FIG. 8.

Along the outside circumference of each freewheel wheel, 24R and 24L, provide a plurality of horizontally projecting rods 28 that provide structural support to typical laminated electric motor field frames 29.

Right side field coils 30R1 and 30R2, are supported to wheel 24R, and left side field coils 30L1 and 30L2, are supported to wheel 24L.

It should be noted that the grooved 21 surfaces on body 13R and 13L extend to just beyond the outboard surface of the corresponding stabilizer disk, 34R and 34L, that are provided with lugs 19, that correspond to the body 21 grooves. Cont. ref to FIG. 3 and FIG. 4.

Outboard of disk 34R provide a spacer disk 35R and outboard of disk 34L, provide a spacer disk 35L.

Disks 35R and 35L each have a smooth center mounting hole and the disks ride smoothly on the surface of the respective bodies they are carried on.

Provide that the outboard end of body 13R is just beyond the outboard face of disk 35R, and the outboard end of body 13L is just beyond the outboard face of disk 35L.

Provide typical right hand threaded support elements 13RR, not shown, to support the outboard end of body 13R to axle 6, and provide typical left hand threaded support elements 13LL, not shown, to support the outboard end of body 13L to axle 6.

Provide typical spacer washers 13WW, not shown, to achieve overlap of step on outboard end of freewheel body, where required.

Just outboard of the spacer disks, 35R and 35L, provide a modified shape to the axle 6, so that the axle's circular configuration has a flat leading edge, and a flat trailing edge, that extends lengthwise, to the axle's 6 outer ends.

Provide the right modified end of the axle 6 with a right hand thread, and the left modified end of the axle 6 with a left hand thread.

Provide thin containment washers, 36R outboard of disk 35R, and 36L outboard of 35L.

The containment washers, 36R and 36L, each has a center mounting hole that corresponds to the modified flat sided shape of axle 6. Provide two right hand threaded nuts, 37R and 38R, disposed, locked on each other, outboard of 36R, and two left hand threaded nuts, 37L and 38L, disposed, locked on each other, outboard of 36L.

Outboard of nuts 37R and 38R, provide a laminated, structural armature frame 39R, stationarily mounted on axle 6, and outboard of nuts 37L and 38L, provide a laminated, structural armature frame 39L, stationarily mounted on axle 6. Continue reference to FIG. 3 and FIG. 4.

Motor Assembly Note:

On the right side of rear wheel 3, between the outboard face of freewheel wheel 24R and the inboard face of armature frame 39R, a motor assembly 40R is provided, and on the left side of the rear wheel 3, between the outboard face of freewheel wheel 24L and the inboard face of armature frame 39L, motor assembly 40L is provided.

To facilitate fastening elements of the motor assembly to the outboard face of the freewheel wheel 24R, provide a raised circular non-conducting base plate 49R, fastened to the outboard face of 24R.

Figure 5:
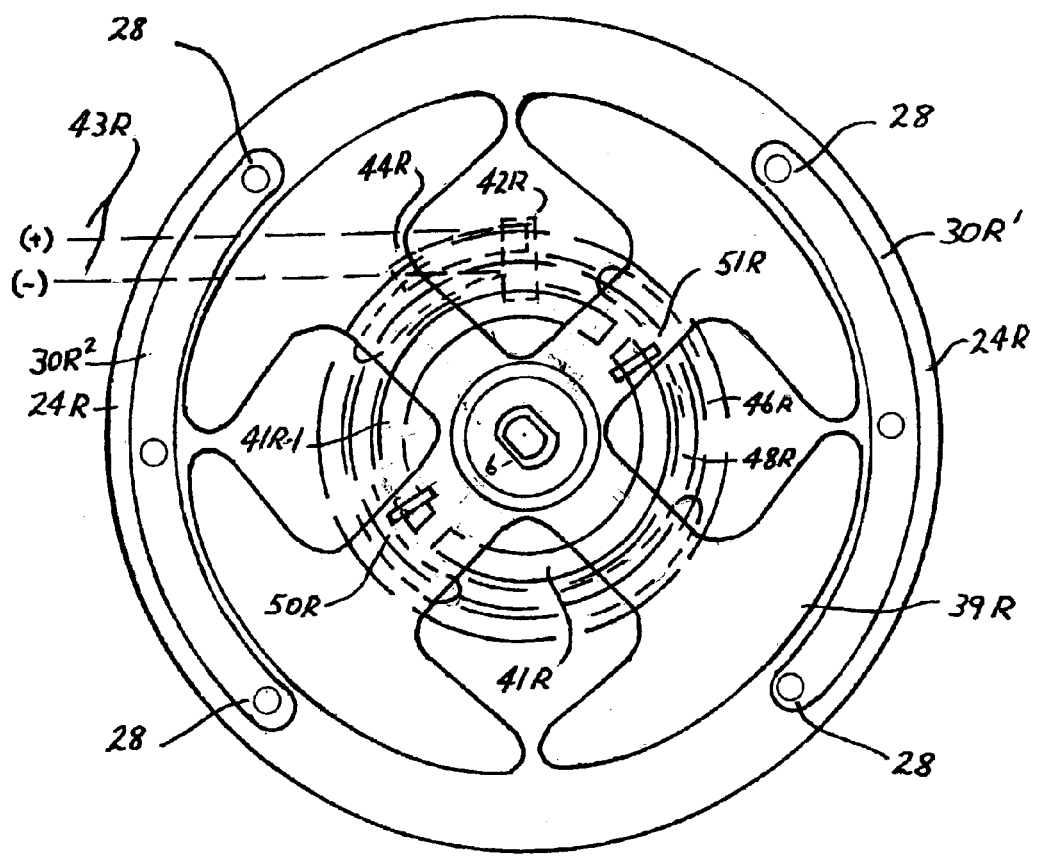
FIG. 5 is a section through line 5—5 of FIG. 3, and FIG. 4, to show a typical view of the motor armature, commutator, and field, placement on each side of the rear wheel of the bicycle.

And, to facilitate fastening elements of the motor assembly to the outboard face of the freewheel wheel 24L, provide a raised circular non-conducting base plate 49L, fastened to the outboard face of 24L. See FIG. 18, and then refer again to FIG. 3 and FIG. 4, and to FIG. 5.

Continuing, in motor assembly 40R, provide interface elements that include, a commutator 41R and 41R1, a combination (−) and (+) motor circuit contact shoe 42R, and the electric leads 43R, to and from the 42R shoe.

Commutator elements 41R and 41R1 are carried fastened to the inboard face of armature 39R.

Commutator elements 41R and 41R1 are carried fastened spaced apart to provide polarity, and are typically flat and semi-circular.

Contact shoe 42R is carried by bracket 44R, supported to armature frame 39R.

Bracket 44R also supports a hinged lever type brush 45R to a flat electric current circuit ring 46R, and a hinged lever type brush 47R to a flat electric current circuit ring 48R.

Ring 46R encircles ring 48R.

Circuit rings 46R and 48R, are carried, mounted on the outboard facing, raised, circular base plate 49R—on the outboard face of wheel 24R.

Also in motor assembly 40R, provide two motor brush units, 50R and 51R.

Include typically in each unit, 50R and 51R, a carbon brush 50R-1, a brush holder 50R-2, a brush holder cap 50R-3, a brush tension spring 50R-4, and a brush unit bracket 50R-5 that supports a brush to the face of the raised base surface 49R, while holding the brush in contact with the surface of the commutator 41R element.

Now, correspondingly, in motor assembly 40L, provide interface elements that include, a commutator 41L and 41L1, a combination (−) and (+) motor circuit contact shoe 42L, and the electric leads 43L, to and from the 42L shoe.

Commutator elements 41L and 41L1 are carried fastened spaced apart to provide polarity.

Contact shoe 42L is carried by bracket 44L, supported to armature frame 39L.

Bracket 44L also supports a hinged lever type brush 45L to a flat electric current circuit ring 46L and a hinged lever type brush 47L to a flat electric current circuit ring 48L.

Ring 46L encircles ring 48L.

Circuit rings 46L and 48L, are carried, mounted on the outboard facing, raised, circular base plate 49L—on the outboard face of wheel 24L.

Also in motor assembly 40L, provide two motor brush units, 50L and 51L.

Figure 6:
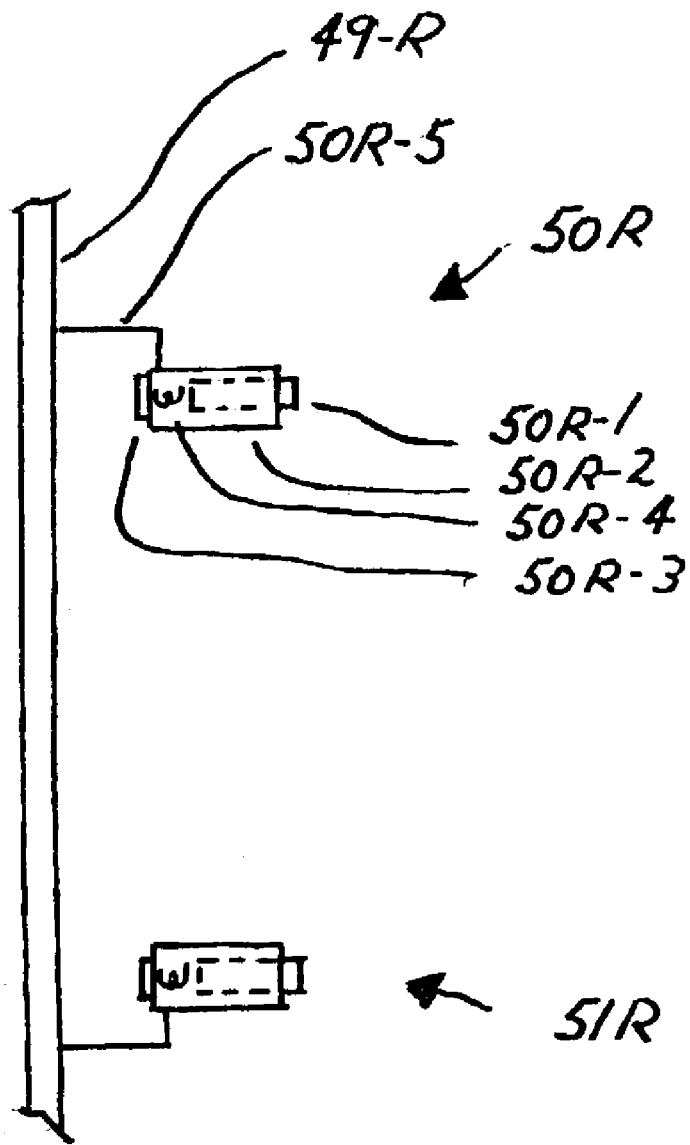
FIG. 6 is a sketch showing typical motor brush elements provided in a motor assembly.

And include typically, in each unit, 50L and 51L, a carbon brush 50L-1, a brush holder 50L-2, a brush holder cap 50L-3, a brush tension spring 50L-4, and a brush unit bracket 50L-5 that supports a brush to the face of the raised base surface 49L, while holding the brush in contact with the surface of the commutator 41L element. See FIG. 6.

Outboard of armature frame 39R provide two right hand threaded nuts 54R and 55R, disposed locked on frame 39R and on each other.

Outboard of armature frame 39L provide two left hand threaded nuts 54L and 55L, disposed locked on frame 39L and on each other.

Outboard of nut 55R, provide a thin spacer washer 56R that has a circular mounting hole, that fits onto the axle 6. See FIG. 3 and FIG. 4.

Outboard of nut 55L, provide a thin spacer washer 56L that has a circular mounting hole, that fits onto the axle 6.

Outboard of washer 56R, provide two right hand threaded nuts, 57R and 58R, disposed locked on each other.

Outboard of washer 56L, provide two left hand threaded nuts, 57L and 58L, disposed locked on each other.

Outboard of nut 58R, right side of the rear wheel 3, and outboard of nut 58L, left side of the rear wheel 3, the rear wheel axle 6 engages the frame's 1 near vertical members.

Rear frame member 59R, adjacent nut 58R, is provided in its length dimension, with elongated axle 6 slot 60R, and rear frame member 59L adjacent nut 58L, is provided in its length dimension, with elongated axle 6 slot 60L.

These axle slots, 60R and 60L, correspond in shape to the axle's 6 flat sides, and provide stable, stationary, fastening points for the axle 6.

Outboard of frame member 59R, provide two right hand threaded nuts, 61R and 62R, disposed fastened hard on the 59R frame member, and on each other, otherwise stabilizing the right end of axle 6 to the bicycle frame 1.

And outboard of frame member 59L, provide two left hand threaded nuts, 61L and 62L, disposed fastened hard on the 59L frame member, and on each other, otherwise stabilizing the left end of axle 6 to the bicycle frame 1.

Examiners "Moveable Pawl Concept Insight"—Note

At this point in construction of the instant invention, consider the idea of providing a bicycle rider with the capability of mechanically, by hand, changing the point of ratcheting leverage being applied to the freewheel wheel's 24R ratcheting groove 25 on the right rear, and to the freewheel wheel's 24L ratcheting groove 25 on the left rear, to take advantage of the momentum generated in the application of pedaling torque to the rear wheel 3 of the bicycle.

The embodiment of the assembly required to achieve this rider capability, includes means of mechanically disengaging ratcheting pawls, and moving them along the wheel's, 24R and 24L, radian grooves, outward, and then reengaging, them, the pawls.

Specification detailing the assemblies that provide the rider the capability of relocating ratcheting pawls to take advantage of ongoing momentum, is presented as follows.

Figure 7:
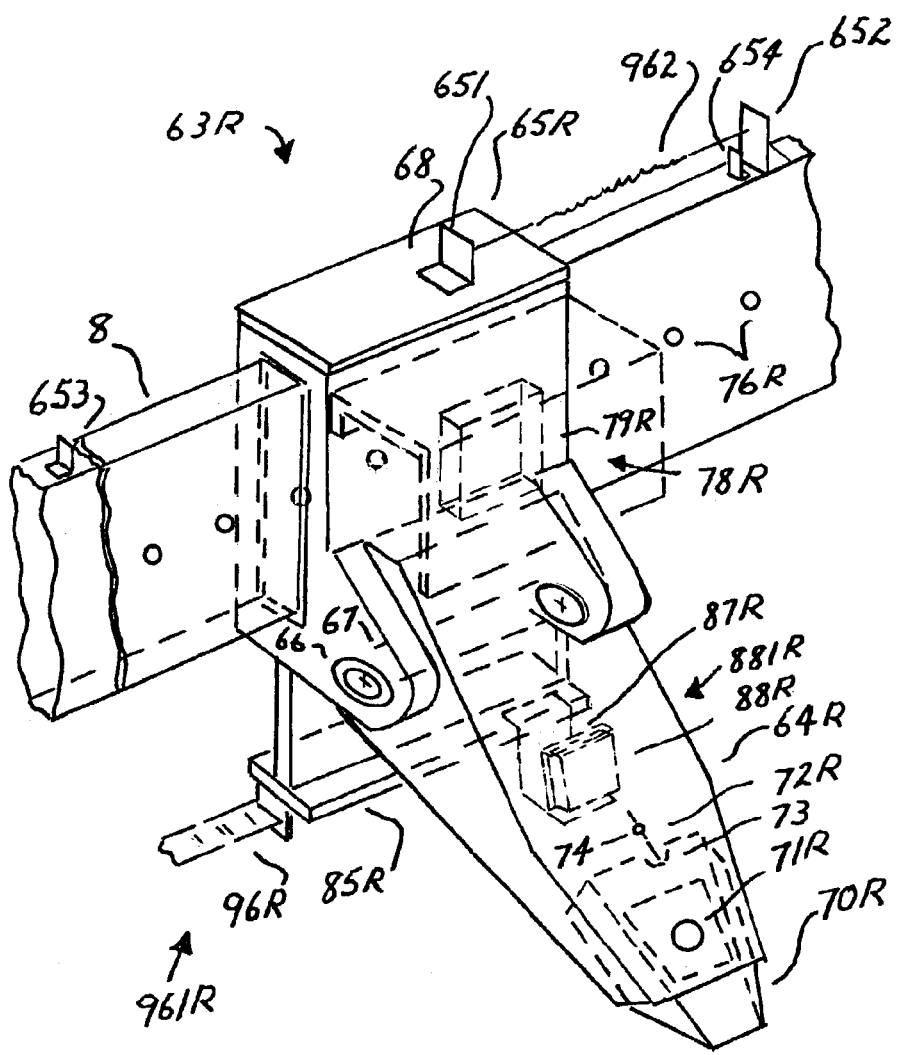
FIG. 7 is a perspective view of a typical bracket used to support a pawl to a pedal bar.
Figure 8:
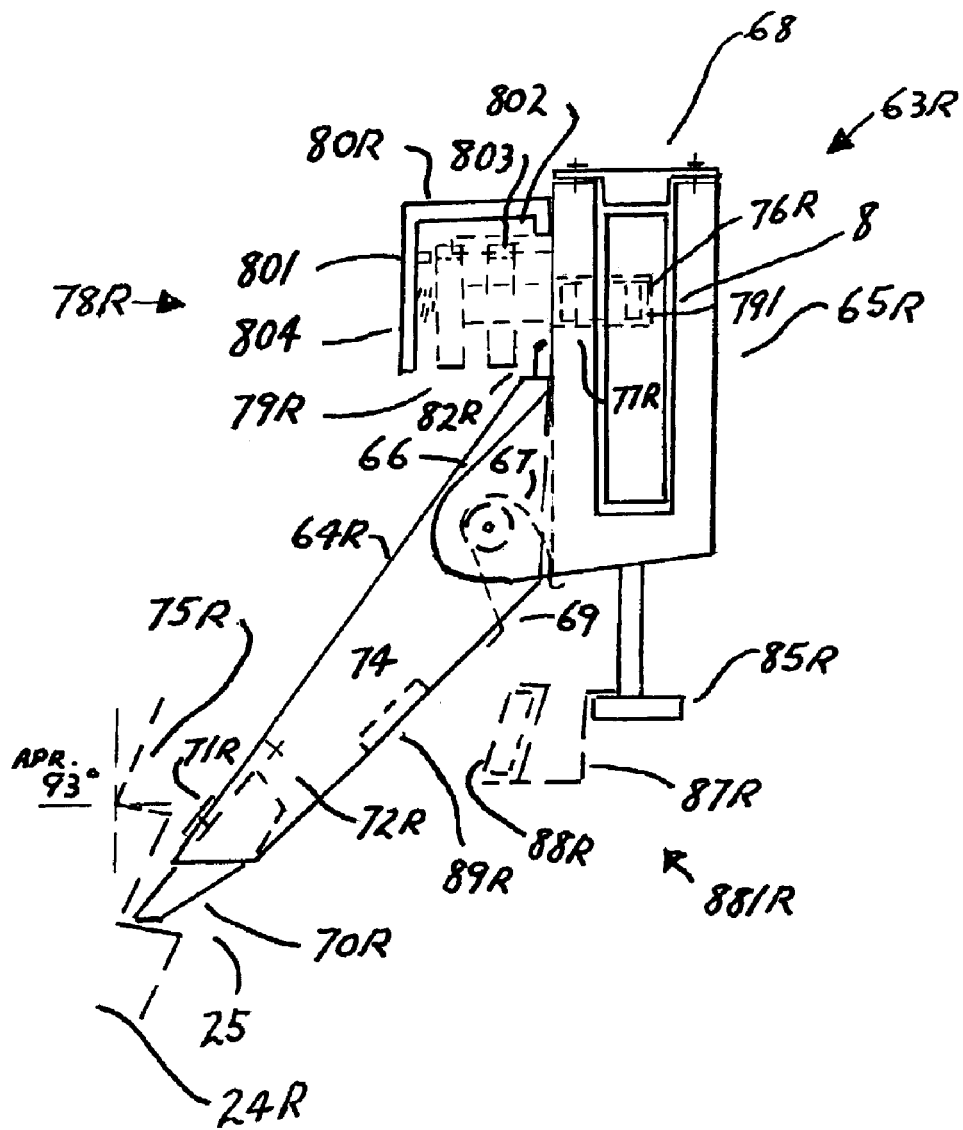
FIG. 8 is a side elevation drawing of a typical pawl, carried by the pedal bar bracket shown in FIG. 7, depicting the pawl's engagement with a radian groove in the freewheel wheel's vertical face.

Again, commencing, and continuing our pursuit of building the inventions right side rear wheel 3 assemblies, and its left side rear wheel 3 assemblies, simultaneously, begin by referring to FIG. 7 and FIG. 8.

Provide pawl deployment assemblies 63R on pedal bar 8 and 63L on pedal bar 9.

Assembly 63R includes a pawl 64R that is supported to pawl bracket 65R by hinge 66 pin 67.

Assembly 63L includes pawl 64L that is supported to pawl bracket 65L by hinge 66 pin 67.

Pawl bracket 65R slides on pedal bar 8 and pawl bracket 65L slides on pedal bar 9.

Each bracket has a top plate 68 that holds the bracket in contact with the bar it slides on. Continue reference to FIG. 7, and FIG. 8.

A tension spring 69 on pin 67 is provided to apply clockwise turning pressure, one on each pawl, while holding the pawl in a clockwise, turning limit, ratcheting mode.

In the ratcheting mode, the hinged end of each pawl body, that is 64R, and 64L, is stabilized, engaging and hard up against the vertical face of the pawl's bracket—64R against 65R, and 64L against 65L.

The ratcheting end of each pawl has an end point that is flexibly fastened to the underside of the pawl body by a pivot pin.

Pawl body 64R has end point 70R fastened to it by pin 71R.

Pawl body 64L has end point 70L fastened to it by pin 71L.

End point 70R is stabilized by spring probe 72R. The 72R probe is carried by pin 74 that is set in 64R. The 72R probe's unfastened end projects into a V slot 73, cut into the inboard end of the 70R end point.

End point 70L is stabilized by spring probe 72L. The 72L probe is carried by pin 74 that is set in 64L. The 72L probe's unfastened end extends projects into a V slot 73 73, cut into the inboard end of the 70L end point.

In assembly, end point 70R resides in and mechanically engages freewheel wheel 24R's groove ridge 75R, and end point 70L resides in and mechanically engages freewheel wheel 24L's groove ridge 75L, to provide flexible engagement of pawl end points with the freewheel wheels, 24R, and 24L, as pedal leverage is imparted to the bicycle 1 wheel 3.

Provide apparatus for stabilizing each pawl in a selected position along the pedal bar that it slides on.

Accordingly, refer to FIG. 7, and note and provide a plurality of V slot holes 76R, equally spaced along the vertical outboard face of each pedal bar.

The bottom of each V shaped, slotted hole, is perpindicular to the bar's, 8 and 9's length dimension. See FIG. 8.

Provide V slot holes 76R in bar 8, and V slot holes 76L in bar 9.

Provide a pawl bracket stabilizing pin assembly, 78R for pawl 64R and 78L for pawl 64L.

Stabilizer pin assembly 78R has a structural T shaped pin 79R that has a V shaped tip 791 on the end of the T's vertical member that can seat in each bar 8 V slot 76R, as seen in FIG. 8, a stabilizer pin containment bracket 80R, as seen in FIG. 8, that has a pin travel stop 801 that limits the horizontal travel of an unseated pin, and a pin rotation stabilizer blade 802, that fits in a horizontal slot 803, in the top of the pin's horizontal member that keeps the pin from rotating, when it is moved, and a tension spring 804, contained between the vertical inboard member of the containment bracket 80R and the vertical member of the T, that tends to push the pin 79R through a pin guide hole 77R provided in the outboard vertical member of pawl bracket 65R, into a seated position in a bar 8 V slot hole 76R.

Each pawl carries a stabilizing pin displacement probe on the top surface of its hinged end—64R has 82R and 64L has 82L.

The end of each probe, by virtue of its mounted position, can engage the bottom surface of the pawl's stabilizing pin, and push the pin out of the pedal bar V slot hole that it is seated in.

82R can displace pin 79R from a V slot hole 76R in bar 8, and 82L can displace 79L from V slot hole 76L in bar 9.

These displacements occur when a pawl is rotated out of a ratcheting engagement with its corresponding freewheel wheel groove.

Refer again to FIG. 7 and FIG. 8 and note that an electromagnet assembly 881R is provided where bracket 65R carries electromagnet 88R on bracket 87R which is fastened to an inverted structural T 85R extension out of the U shaped pawl bracket 65R.

Note the oblique attitude of 88R so that it corresponds to a pawl magnetic response block 89R mounted in the bottom of the 64R pawl. Circuit to electromagnet assembly 881R will be detailed below.

Continuing, provide that electromagnet assembly 881L, for bracket 65L, corresponds to electromagnet assembly 881R.

Note that typically, tension spring 962, between brackets 651 on 68, and 652 on bar 8, applies counter pressure on bracket displacement tape specified below, and angle brackets 653 and 654 limit the travel of a pawl bracket.

With continued reference to FIG. 7, and with reference to FIG. 11, note and provide a tape that connects the pawl bracket to a bicycle frame 1 mounted pawl deployment control box.

The tape could be made of plastic, slightly stiff, and adaptable to back and forth, fixed increment, movement.

Accordingly, provide a tape actuated pawl bracket deployment assembly 961R, where tape 96R is fastened by one of its ends to the bottom of the inverted structural T 85R extension out of pawl bracket 65R, and the tape's unfastened end passes through a compression spring tape guide 107R, that is supported to the bicycle frame 1 adjacent axle 6, by bracket 107-1, (see FIG. 9), and then through tape guide 110R, supported to frame 1, adjacent seatpost 4, by dual bracket 111, (see FIG. 10), and then through tape guide 112R, supported to bicycle frame cross bar 113, by bracket 112-1, (see FIG. 11).

The 96R tape is then connected by its other end to control box 114 sled member 119 (see FIG. 12) by bracket 1151, thereby connecting the tape to the control box pawl control lever, a panel, 115.

Figure 14:
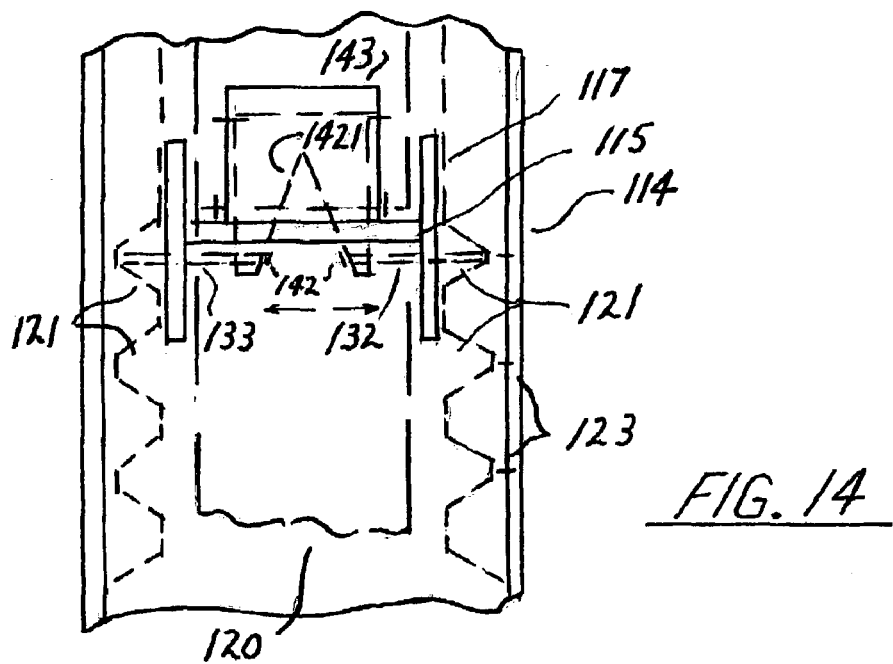
FIG. 14 is a top view drawing of the pawl deployment control box depicted in FIG. 12.
Figure 13:
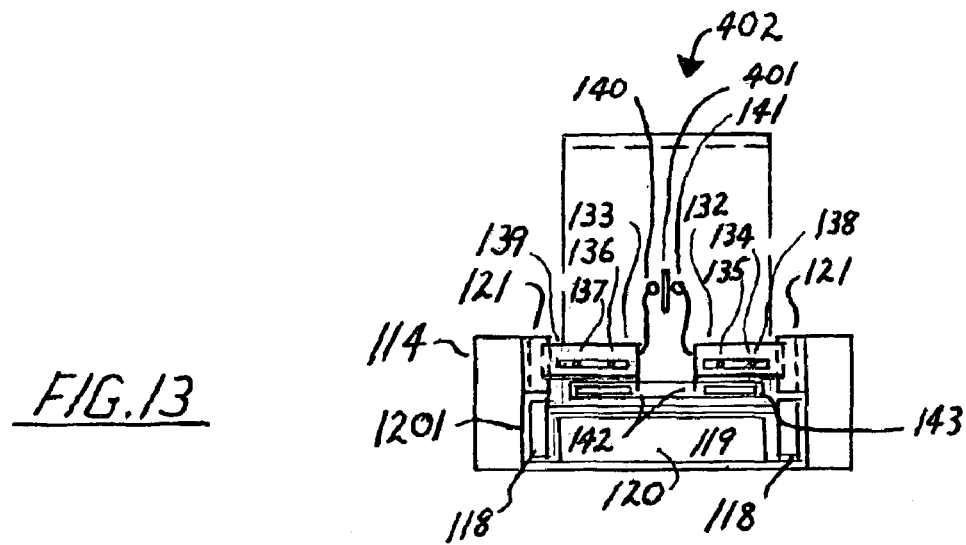
FIG. 13 is an end elevation view drawing of the pawl deployment control box depicted in FIG. 12.

Continuing, provide a tape actuated pawl bracket deployment assembly 961L, that is for connecting pawl bracket 65L to the control box pawl control lever 115, and that corresponds to assembly 961R. With reference to FIGS. 12, 13, and 14, provide a pawl control box 114 assembly 116, including a rectangular box 114 that carries a sled 117 with runners 118 that are disposed, spaced apart by horizontal body member 119, and straddeling an elongated rectangular member 120 that is fastened along the bottom of 114 to provide a trackway 1201 for the sled to slide in.

Along the top interior surface of each of the control boxe's sides, provide a plurality of V grooves that are disposed equally spaced apart, and that are in side to side correspondence, their openings facing each other, so that a precise horizontally measured distance can be represented by their groove location marks 123, shown on the horizontal top surface of the groove embodiments, along the travel of the sled 117.

The groove location marks 123 correspond to positions along each pedal bar, 8, and 9, that the pawls 64R and 64L are selectively set at for ratcheting the freewheel wheels, 24R and 24L.

Provide an electromagnet circuit switch 124 subassembly 125 that has a tension spring 126 providing clockwise pressure on the switch lever 127.

The 127 lever is supported to control box 114 control lever 115 by hinge bracket 128.

Provide a lever stop Z bracket 129 to restrain lever 127's clockwise movement when the 124 switch is in off mode.

When lever 127 is depressed counterclockwise, it bridges a + side and a − side element, 130, that causes electromagnets 88R and 88L to become energized, thus causing the pawls to disengage from their ratcheting mode.

And when lever 127 is depressed, probe 131 engages lever 115 and thereby moves the sled along the trackway 1201, repositioning the pawls.

Provide additional elements to the control box assembly 116 including, a pair of sled 117 brake blades, 132 and 133.

Each blade embodies a horizontal slot and can therefore slide horizontaly, held by pins, 132 by 134 and 135, 133 by 136 and 137, that are set in horizontal alignment in the face of panel lever 115.

Provide a sled 117 brake blade spring assembly 402 that includes spring 140 and 141, held by pins in the vertical face of lever 115, and stabilized rotationally at one end by a turn limit bar 401, carried by 115, between them.

Spring 140 exerts outward pressure on and keeps blade 133 seated in a groove 121, and in like fashion spring 141 exherts outward pressure on and keeps blade 132 seated in a groove, thus achieving a sled 117 braking effect.

Complimentary to this outward pressure feature, each blade is provided with a vertical tab, 142, that extends down from the inboard blade edge, extending into a V slot in a horizontally disposed blade displacement plate 143. See FIG. 13, and FIG. 14.

Now, when lever 127 (FIG. 12) is depressed, the V edges of plate 143 engage the blade tabs, 142, and squeeze them together, to thus achieve disengaging the brake blades, 132 and 133, from the slots 121 they reside in—this frees the stationary attitude of the sled 117—and the apparatus 116 provides mobility to the 64R and 64L pawl brackets for movement to a selected positioning on pedal bar 8 and pedal bar 9.

Concept Note 3

The idea of the invention here is to provide a pawl control box assembly that includes a hinged lever to actuate electromagnets that when energized, displace pawls from ratchetinq engagement with freewheel wheels, in combination with a sled mounted lever that supports flexible blades to a sled locking mode, selectively chosen, along a graduated locator scale on the controllers top surface.

Figure 15:
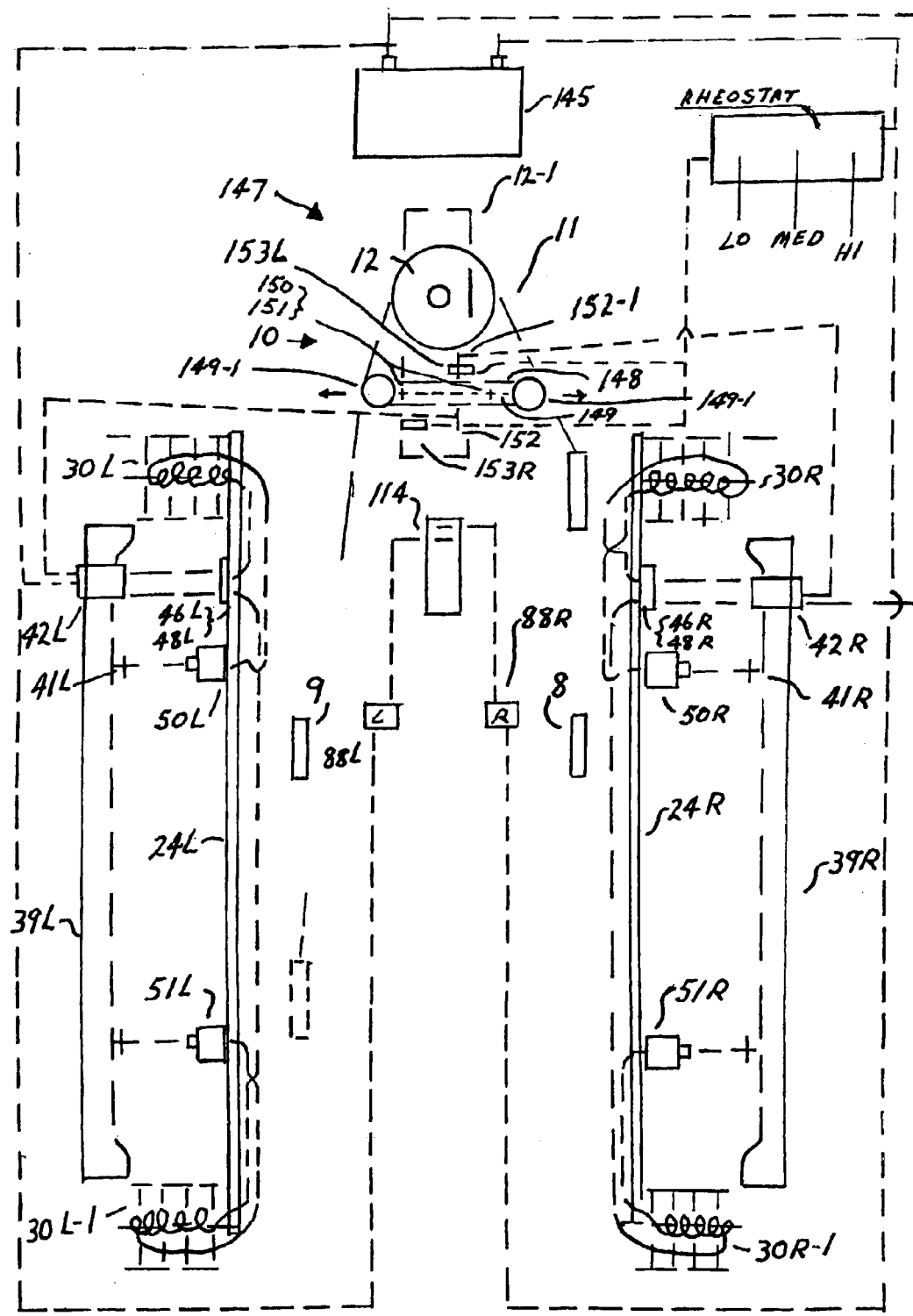
FIG. 15 is a drawing of the inventions electrical circuit.

Now with reference to FIG. 15, provide the elements required in the inventions electrical circuit as follows, wires to connect all circuit components, a battery 145, a pedal bar equalizer assembly 10 electrical current to motor switch 147 assembly 147-1,—note that as specified above, assembly 10 includes chain 11, pulley 12, and pulley switch to frame, support bracket 12-1.

Assembly switch 147 also has a sliding bar 148 that has a slot 149 and deflector wheels 149-1, and is supported to bracket 12-1 by pins 150 and 151.

The bar 148 has two contact posts, 152 and 152-1 carried vertically extending, one from the top of the bar, and one from the bottom of the bar, so that as the bar 148 is diverted back and forth, as a result of the rider's pedaling the pedal bars, bottom post 152 engages motor contact 153R on the left side of the rear wheel 3, and then, as the bar 148 is diverted back to the right, post 152-1 engages motor contact 153L on the right side of wheel 3.

152 engaging 153R provides circuit to motor assembly 40R on the right side of wheel 3, and 152-1 engaging 153L provides circuit to motor assembly 40L on the left side of wheel 3.

Note in circuit diagram FIG. 15 that circuit to electromagnets 88R and 88L is direct from battery 145 to and through controller 114.

Figure 17:
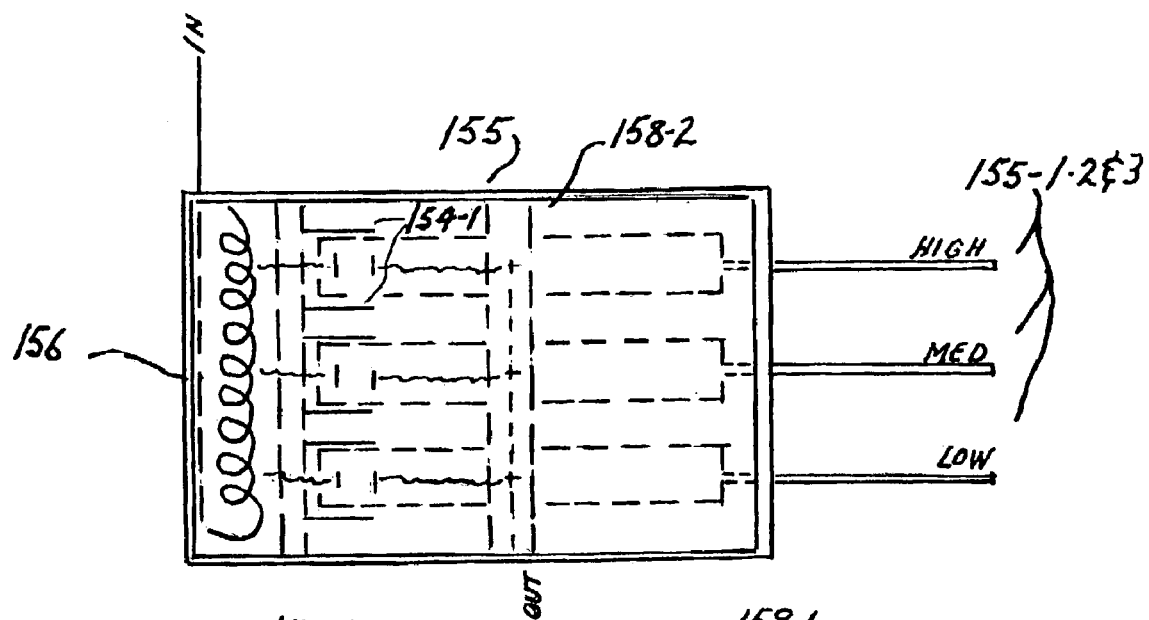
FIG. 17 is a top view drawing of the current level selector, shown in FIG. 16.
Figure 16:
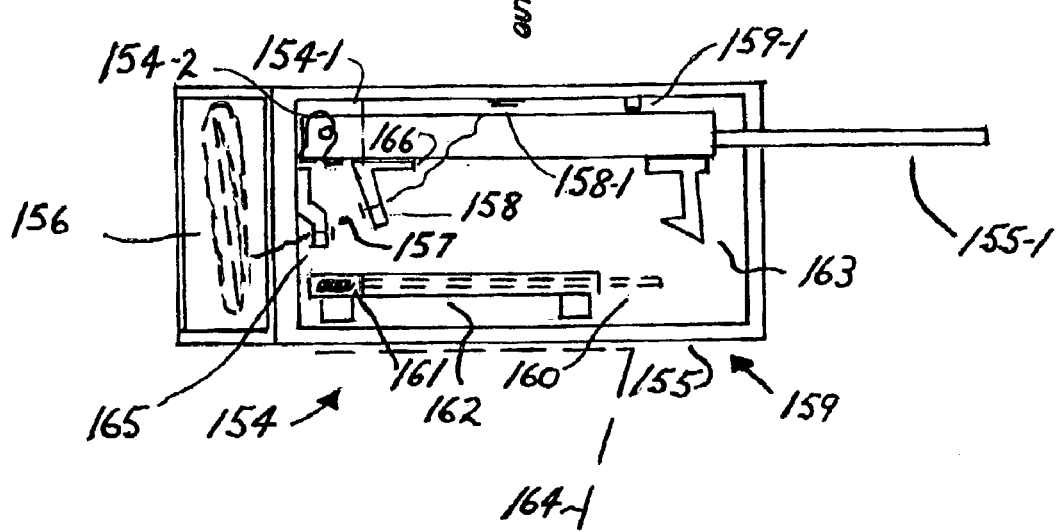
FIG. 16 is a side elevation view drawing of a current to motor assembly, level selector.

Also with reference to FIG. 15, provide the inventions circuit with a current level selector, rheostat, controller assembly 154, that has the following, as shown in FIG. 16 and FIG. 17, an enclosure 155, three current selector levers, 155-1, 2, and 3, a rheostat element 156, line current contacts 157, 158, and 158-1, a current pick up plate 158-2, a lever hold mechanism 159, a lever up-travel limit post 159-1, a sliding, lever hold and release plate 160, a sliding plate tension spring 161, a slide plate enclosure and guide 162, a slide plate displacement probe 163, and a 154 assembly bracket 164.

Line contacts for each current lever are disposed as follows:

the three 157 contacts are supported to 155 by bracket 165, the three 158 contacts are each supported to a current lever by angle bracket 166, the three 158-1 contacts are supported to 155 by plate 158-2.

Actuation of an assembly 154 lever, 155-1, 155-2, or 155-3, provides for low, medium, or high circuit current from battery 145 to motor assembly 40R or 40L.

Assembly 154 is carried, supported to frame 1 by bracket 164.

Each current lever, 155-1, 2, and 3, are pivotally supported to enclosure 155, between two vertical support ribs, 154-1.

Each current lever, 155-1, 2, and 3, has a tension spring 154-2 that provides counter clockwise pressure on the lever, pushing the lever up.

I claim:

1. An improved electrically assisted pedaled vehicle comprising:

a frame, seat, handlebars, pedal bars, a pedal bar equalizer chain, an equalizer chain pulley, a modified rear wheel hub having a right hand freewheel thread on its right side, a left hand freewheel thread on its left side, and a large diameter hub body incorporated bushing at the base of each threaded end, a rear wheel having an elongated axle that is round in shape but rectangular in shape near its extreme ends, a hub mounted modified right hand threaded freewheel body having a smooth large diameter surface, a lesser diameter grooved surface, a hub mounted modified left hand threaded freewheel body having a smooth large diameter surface, a lesser diameter threaded and grooved surface, and a still lesser diameter grooved surface, vehicle elements that are correspondingly, flexibly, mounted on each freewheel body, including, a right side of wheel pedal bar having a smooth bearing surface mounting hole and a plurality of V slotted holes drilled and equally spaced along its outboard vertical face, a left side of wheel pedal bar having a smooth bearing surface mounting hole and a plurality of V slotted holes drilled and equally spaced along its outboard vertical face, each said pedal bar supports a flexibly fastened, pawl supporting, bracket that can be slid back and forth, along said bar, by a flexible tape that is connected by one end to bottom extension of said bracket, and by its other end to a hand operable pawl positioning controller, a right side of rear bike wheel, large diameter pedal bar stabilizing bushing having center mounting hole lugs that engage said body grooves, providing a smooth bearing surface for said right side pedal bar, a left side of rear bike wheel, large diameter pedal bar stabilizing bushing having center mounting hole lugs that engage said body grooves, providing a smooth bearing surface for said left side pedal bar, a large diameter left side of bike wheel, freewheel wheel, having center mounting hole lugs, a large diameter left side of bike wheel, freewheel wheel, having center mounting lugs, each freewheel wheel's inboard vertical face having a plurality of radian oriented ratcheting grooves, that are engaged by said pawl, in a ratcheting motion, each freewheel wheel's outboard vertical face supporting horizontally projecting rods that carry coiled wires of a motor field each freewheel wheel's outboard vertical surface carrying a flat, circular, non conducting base plate that supports motor elements including, two flat concentric electric current conducting circuit rings, and a pair of carbon motor commutator brushes, and other motor elements correspondingly, stationarily, mounted, outboard of each freewheel body on said axle, including, a large diameter right side of bike wheel, laminated, structurally framed armature and corresponding commutator unit, having a center mounting hole that corresponds to said axle's rectangular shape, and, a large diameter left side of bike wheel, laminated, structurally framed armature and corresponding commutator unit, having a center mounting hole that corresponds to said axle's rectangular shape, each said armature's inboard vertical face having a bracket that supports (+) and (−) electric current leads, and a pair of hinge lever brushes supported to, said freewheel wheel supported, concentric rings, each said commutator being comprised of two complimentary semicircular, flat, conducting surfaces, mounted on the vertical inboard face of said armature, and configured as a circle, with the ends of one semicircle spaced from the ends of the other semicircle to provide a (+) semicircle commutator element, and a (−) semicircle commutator element, outboard freewheel body support elements including, right hand threaded nuts, and washers, and, outboard freewheel body support elements including, left hand threaded nuts, and washers, and freewheel wheel ratcheting elements, that are correspondingly, flexibly mounted, on each said pedal bar, including:

a right side of bike wheel, structural, U shaped, pedal bar mounted, pawl bracket, and, a left side of bike wheel, structural, U shaped, pedal bar mounted, pawl bracket, a right side of bike wheel pawl that is carried by said bracket, and has a flexible, freewheel wheel radian groove engaging, end point, and a left side of bike wheel pawl that is carried by said bracket, and has a flexible, freewheel wheel radian groove engaging, end point, a pawl bracket metal magnetic response block that is disposed, mounted in the bottom of said pawl, a pawl, bracket supported, ratcheting mode disengager electromagnet, a pawl bracket, supported, structural T shaped, pawl bracket stabilizing pin, frame mounted, pawl bracket deployment, tape strip stabilizing guides, tape strips that connect each pedal mounted pawl bracket and pawl to a hand operated, combination, pawl ratcheting mode disengaging, and pawl deployment, electro-mechanical, controller unit, that is mounted adjacent said bicycle's handlebar, and that is used to position said pawl brackets and pawls along said pedal bars, to utilize a momentum, leverage advantage, a battery supported by said bicycle frame, a rheostat motor current supply, controller, supported to said bicycle frame, a pedal bar actuated motor circuit current controlswitch, supported by said bicycle frame, a bracket supported tension spring to apply counter pressure on each pawl bracket to offset tape bracket displacement pressure, and pedalbar brackets to limit the travel of a pawl bracket.

2. The improved electrically assisted pedaled vehicle of claim 1 wherein said coiled wires carried by said freewheel wheel's horizontally projecting rods, are motor fields that are disposed on laminated motor field frames that are supported by said rods.

3. The improved electrically assisted pedaled vehicle of claim 1 wherein said armature is a laminated structural frame, stationarily mounted on said axle.

4. The improved electrically assisted pedaled vehicle of claim 1 wherein each said large diameter freewheel wheel's inboard vertical face further comprises a plurality of radian oriented grooves that extend in length from near the wheel's center to near the wheel's outer circumference, and where each grooves surfaces, in section, are configured as a modified V, with its long member disposed at approximately 67°, and its short member disposed at approximately 93°, where the 93° radian oriented step surfaces facilitate smooth withdrawal of said pedal bar bracket supported pawl, when the pawl is magnetically pulled from its ratcheting engagement with the wheel's vertical face.

5. The improved electrically assisted pedaled vehicle of claim 1 wherein said concentric rings further comprise a (−) circular, metal, current conducting ring, within, a (+) circular, metal, current conducting ring, to facilitate the flow of electrical current from a stationary point to a moving point, said rings bridging current to said field coils, and said motor commutator element brushes.

6. The improved electrically assisted pedaled vehicle of claim 1 wherein said pair of carbon motor commutator brush units is comprised of a (+) brush unit, and a (−) brush unit, where each unit includes a carbon brush, a brush holder, a brush holder cap, a brush tension spring, and a brush unit bracket, where the unit bracket, fastened to a plate on the vertical outboard vertical face of a freewheel wheel, supports said brush to contact with a commutator element.

7. The improved electrically assisted pedaled vehicle of claim 1 wherein said bike wheel pawl is further comprised of a hinge pin that flexibly supports the pawl to the bracket that carries it along a pedal bar, held by a tension spring, under clockwise pressure, in a ratcheting attitude, hard against the bracket surface, inclined at an up limit of approximately 47° up from the vertical, engaging, with its flexible, pivoting, directionally stabilized, end point, said freewheel wheel's radian oriented grooves, to ratchet and propel said wheel.

8. The improved electrically assisted pedaled vehicle of claim 1 wherein said electro-mechanical controller unit is further comprised of a sled that slides in a unit trackway that has vertical grooves, in its sides, that said sled's brakes can be slid into, to stabilize the position of said sled, said grooves corresponding to said pedal bar V slotted holes that a pawl bracket supported T shaped pin can be slid into, to selectively, and correspondingly, stabilize the position of a pawl's bracket.

9. The improved electrically assisted pedaled vehicle of claim 1 wherein said electro-mechanical controller unit is further comprised of flexible tapes that connect said right side of bike wheel pedal bar supported pawl bracket, and said left side of bike wheel pedal bar supported pawl bracket, each to an extension of said sled, so that sled movement and positioning, corresponds to pawl bracket and pawl, movement and positioning.

10. The improved electrically assisted pedaled vehicle of claim 1 wherein said electro-mechanical controller unit is further comprised of a (+) side and a (−) pair of contacts, that when bridged, energizes said electromagnet that is disposed on a bracket beneath each said pawl, thus pulling said pawl out of its ratcheting attitude so it can be moved.

11. The improved electrically assisted pedaled vehicle of claim 1 wherein said pawl bracket is further comprised of a metal, electro-magnetically responsive block, disposed beneath said pawl, to facilitate pulling the pawl out of its ratcheting engagement with the grooved vertical inboard face of a said freewheel wheel.

12. The improved electrically assisted pedaled vehicle of claim 8 wherein said T shaped pin is further comprised of a V shaped tip, on the end of the T's vertical member, that can seat in each pedal bar V slot hole.

13. The improved electrically assisted pedaled vehicle of claim 1 wherein said pawl bracket is further comprised of a T pin containment bracket that limits the travel of said pin when it is disengaged by said electromagnet from its seat position in said V slot hole, and a T pin tension spring, disposed between the top surface of said T's cross member and the vertical inboard surface of said containment bracket, said spring tending to push the pin back into a seated position.

14. The improved electrically assisted pedaled vehicle of claim 1 wherein said bike wheel pawl is further comprised of a tension spring that applies clockwise turning pressure on a said pawl to keep the pawl engaged with the vertical inboard face of the said freewheel wheel.

15. The improved electrically assisted pedaled vehicle of claim 1 wherein said pedal bar actuated motor circuit current control switch is further comprised of a chain, a large deflector wheel, a frame mounted bracket, a sliding bar, with a lengthwise center slot, that slides on two bracket supported pins, two small deflector wheels supported, one at each end of said sliding bar's rear facing flat side, two contact posts, one extending up from the sliding bar's top edge, one extending down from the sliding bar's bottom edge, two bracket supported contacts, one engaged by said upper post, and one engaged by said lower post, said chain ends fastened one to each pedal bar, said chain remainder encompassing the three deflector wheels, so that said switch is actuated when the pedal bars are moved up and down, the down motion of said left side of bike pedal bar causing said sliding bar to move right and make circuit contact between the top post and its adjacent contact, the down motion of said right side of bike pedal bar causing said sliding bar to move left and make circuit contact between the bottom post and its adjacent contact, where making said circuit contacts provides flow of current to said right side of bike and said left side of bike, motor assemblies, alternately.

16. The improved electrically assisted pedaled vehicle of claim 1 wherein said tape strip stabilizing guides further comprise flexible, compression type, stabilizing guides, where the bike wheel right side tape, and the bike wheel left side tape, run adjacent the elongated rear wheel axle, and the direction of tape travel changes from rearward to approaching forward, and added flexibility would improve stability of the deployed tapes.

17. The improved electrically assisted pedaled vehicle of claim 1 wherein said bracket supported tension spring to apply counter pressure on a pawl bracket that is displaced by tape pressure, further comprises a coiled spring that is supported at one end by a bracket mounted on the top of a pawl bracket and at its opposite end, by a bracket, that is spaced some distance, and supported by the top edge of a pedal bar, where said pawl bracket's travel distance is limited, by two pedal bar brackets, spaced from each other, and carried on the top edge of a pedal bar.

* * * * *